R. T. WILSON.
ARTIFICIAL BAIT.
APPLICATION FILED DEC. 19, 1914.

1,153,473.

Patented Sept. 14, 1915.

WITNESSES
Jas. K. McCathran
H. T. Chapman

Richard T. Wilson
INVENTOR

BY
ATTORNEY

UNITED STATES PATENT OFFICE.

RICHARD T. WILSON, OF HASTINGS, MICHIGAN, ASSIGNOR TO MABEL WILSON, OF HASTINGS, MICHIGAN.

ARTIFICIAL BAIT.

1,153,473.

Specification of Letters Patent. Patented Sept. 14, 1915.

Application filed December 19, 1914. Serial No. 878,115.

*To all whom it may concern:*

Be it known that I, RICHARD T. WILSON, a citizen of the United States, residing at Hastings, in the county of Barry and State of Michigan, have invented a new and useful Artificial Bait, of which the following is a specification.

This invention relates to artificial fish bait, and is designed to provide a bait or lure which will simulate the movements of a live minnow and will remain on the surface of the water while being drawn therealong.

The present invention comprises a buoyant body resembling a minnow in form and provided with hooks or other means for catching fish, while the front or forward end of the bait is formed with a cavity closed at the rear end and expanding toward the front end with an attaching member for the line, which member is usually a swivel, secured to the bait at the bottom or inner end of the cavity. The result of this construction is that the bait when drawn along will remain on the surface of the water and will travel in a zigzag path closely resembling the actions of a minnow, while at intervals of a few feet the bait will dive and immediately return to the surface. Moreover, the cup shaped cavity at the front end of the bait throws a spray. The various movements and effects of the bait while being drawn through the water are alluring to fish.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed or modified so long as such changes and modifications mark no material departure from the salient features of the invention.

Figure 1:
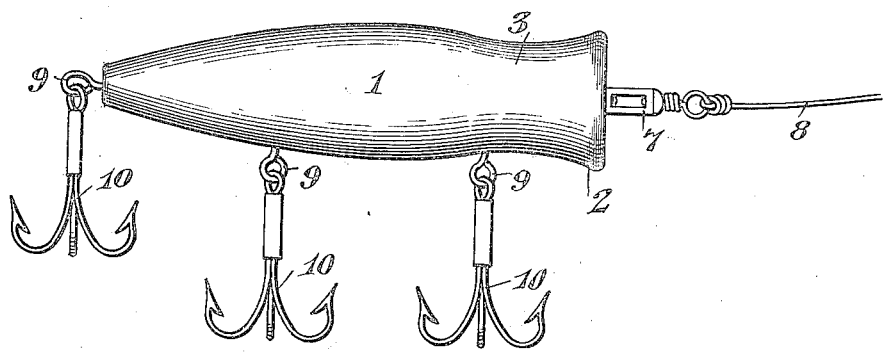
Figure 2:
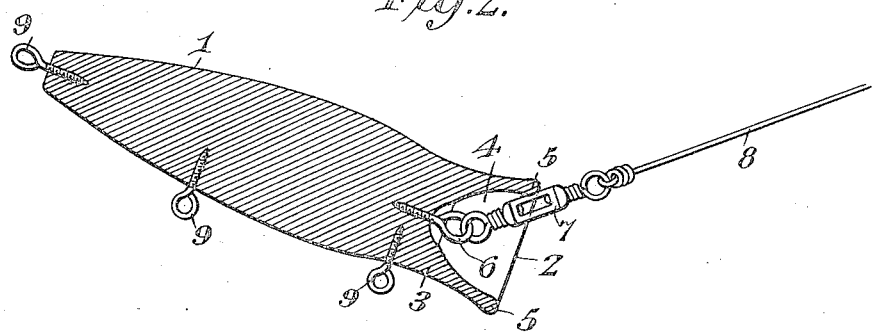
Figure 3:
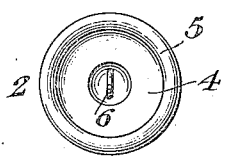

In the drawings, Figure 1 is a side elevation of the bait. Fig. 2 is a longitudinal section thereof with the hooks omitted and showing approximately the position of the bait on diving. Fig. 3 is a front elevation of the bait with the swivel omitted.

Referring to the drawings there is shown an elongated body member 1 of more or less conoidal form simulating generally the appearance of a small fish, such as a minnow, wherefore the body may be described as pisciform. The body 1 is provided with a front or head end 2 which may be approximately of as great diameter as the greatest diameter of the body portion, and this head end joins the body portion by means of a neck 3 of somewhat less diameter merging into the head and body portions by gentle curves.

The relatively widely expanded head end has formed therein an entering cavity 4 with the margins of the head defining a rim 5 about its cavity and this rim may be rounded or otherwise formed to avoid sharp edges. The cavity 4 is conoidal or cup shaped and enters the head and neck axially for an appropriate distance which with a bait of say four inches in length may approximate one inch. The cavity is of greatest diameter at the outer or mouth end and from thence reduces in diameter to the inner or closed end, which closed end is a permanently closed end without outlet.

Secured to the body at the closed end of the cavity 4 in the line of the longitudinal axis of the body is a screw eye 6, or any other holding device appropriate for the purpose. Connected to the eye 6 is a swivel 7 of any appropriate form, and this swivel is designed to receive one end of a fish line 8. At appropriate points along the body 1 are other screw eyes 9 or other similar fastening devices carrying fish hooks 10 of any appropriate character.

The body 1 of the bait or lure may be made of wood or other buoyant material which will float on water even with the hooks 10 attached. The line 8 is made fast to the bait through the swivel in the axial line of the bait but at a considerable distance back of the front end of the bait. Water entering the cavity 4 while the bait is being drawn along the surface of the water, tends by engaging the wall of the cavity 4 at various angles to impart to the bait a wiggling or zigzag motion very similar to the swimming movements of a minnow which may be taken as typical of any small fish used for bait. Since the bait tends to float on the surface of the water while being drawn along the water entering the cavity 4 is subjected to sufficient pressure due to the travel of the bait to cause such water to flow toward the top of the cavity and being projected from thence forwardly, thus producing more or less spray. At intervals the action of the water in the cavity 4 is such as to divert the direction of travel of the bait in a manner to cause it to dive but this diving tendency is almost instantly overcome by the direction of pull of the line, the action of the water in the cavity and the buoyancy of the bait, wherefore the bait again returns to the surface. In actual practice this diving and returning to the surface occurs every few feet, say every three or four feet of travel with the bait remaining during the interim upon the surface of the water where it rapidly zigzags or wiggles with an accompanying throw of spray. All this is highly alluring to fish which are attracted to the moving bait and are apparently deceived by the simulation of the movements of the bait to that of a minnow and by the agitation of the water, for experience has shown that fish eagerly take the bait.

While the bait frequently dives as it travels along, it almost instantly returns to the surface and remains upon the surface for a longer time than is taken in the diving, wherefore the bait is peculiarly a surface bait and is under water but a small fraction of the time it is in use.

The peculiar actions of the bait are ascribed to the presence of the cavity 4 and the fact that the line is attached to the bait at a material distance back of its front end.

What is claimed is:—

1. An artificial bait comprising a pisciform buoyant body having a laterally expanded front end formed with an entering cavity, and means for the attachment of a line to the bait in turn attached to the bait at the inner end or bottom of the cavity.

2. An artificial bait comprising an elongated buoyant body with a laterally expanded front end formed with an entering cavity in substantially axial relation to the elongated body, and a swivel connection for a line in turn connected to the body at the inner end or bottom of the cavity.

3. An artificial bait comprising an elongated body of buoyant material having one end relatively wide and blunt and tapering toward the other end, the blunt end having an axially disposed entering cavity wide at the entering end and narrowing toward and closed at the inner end, and means for the attachment of a line in turn attached to the body at the inner or narrow end of the cavity.

4. An artificial bait comprising a pisciform body of buoyant material with the front end relatively wide and blunt and there formed with an axially disposed cavity tapering from the outer open end toward the inner end and there provided substantially in line with the longitudinal axis of the body with means for the attachment of a line.

5. An artificial bait comprising a generally pisciform body of buoyant material having the front or head end relatively wide and blunt and there provided with an axially disposed entering cavity having its entering or mouth end relatively wide and from thence narrowing to the inner end and there closed, a swivel connection for a line in turn connected to the body at the inner or bottom end of the cavity substantially in line with the longitudinal axis of the body, and fish hooks fast to the body.

6. An artificial bait comprising a generally pisciform body of buoyant material having a blunt front end with an axially disposed entering cavity tapering toward the inner end and there closed and of a width at the open end to define a relatively thin inclosing margin, and means for the attachment of a line to the body at the inner or closed end of the cavity in substantially the longitudinal axis of the body.

In testimony, that I claim the foregoing as my own, I have hereto affixed my signature in the presence of two witnesses.

RICHARD T. WILSON.

Witnesses:
L. G. TOLHURST,
H. G. HAYES.